INVENTOR.
PRYCE N. HALES
BY Christensen, Sanborn, & Matthews
ATTORNEYS

SIGNAL DETECTION SYSTEM HAVING PLURAL OUTPUT CHANNELS

Filed Sept. 8, 1966 3 Sheets-Sheet 2

INVENTOR.
PRYCE N. HALES
BY Christensen, Sanborn, & Matthews
ATTORNEYS

INVENTOR.
PRYCE N. HALES
BY
Christensen, Sanborn & Matthews
ATTORNEYS

United States Patent Office 3,478,317

Patented Nov. 11, 1969

3,478,317

SIGNAL DETECTION SYSTEM HAVING PLURAL OUTPUT CHANNELS

Pryce N. Hales, Centerville, Utah, assignor to The Boeing Company, Seattle, Wash., a corporation of Delaware Filed Sept. 8, 1966, Ser. No. 578,085
Int. Cl. H04q *1/00, 3/00*
U.S. Cl. 340—147 8 Claims The present invention relates to a signal detection system and more particularly to an improved system for providing selective activation of one or more receivers in a multiple receiver communications system.

Figure 1:
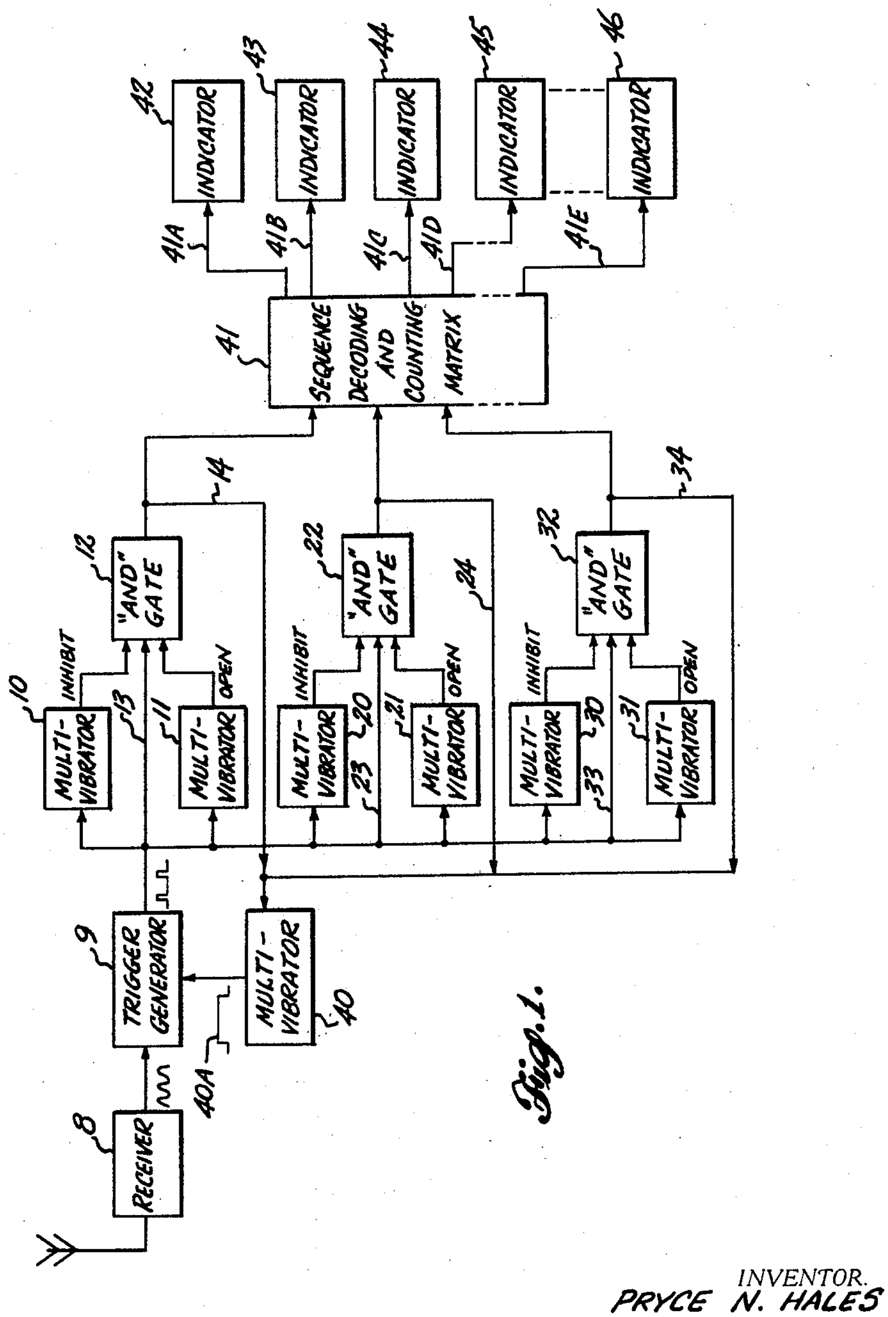

Many present day communication systems use one or more transmitters and a larger plurality of receivers which respond to an audio frequency signal or tone from a transmitter to activate the receiver. Thus the operator of the transmitter is able to activate a selected one of a number of receivers. Such communication systems are typically used by police and other agencies which require activation of selected receivers by means of transmitter control. When simple single side-band radio communication equipment is used it is found that difficulty is encountered in achieving compatibility between the tone selection audio filter design and variations in the audio tone due to radio frequency shifts. In addition, complex combinations of large numbers of addresses have been difficult to achieve with equipment of reasonable size and cost.

It is therefore an object of the present invention to provide an improved signal detection system. Another object of the present invention is to provide an improved receiver selection system controlled by a transmitter which sends out a selection code consisting of a timed sequence of different frequencies.

A further object of the present invention is to provide a signal detection system which is compatible with single sideband radio communications equipment.

Another object of the present invention is to provide a signal detection system for responding to a selected combination of timed signals of different frequencies.

Another object of the present invention is to provide non-synchronous timing circuits for audio tone recognition and separation. Another object of the present invention is to provide a frequency responsive receiver signaling system.

In accordance with the teachings of the present invention a plurality of monostable multivibrator circuits are coupled with the output of a trigger generator to which the time controlled sequence of signaling tones are applied. The trigger generator serves to trigger each of the plurality of multivibrators simultaneously from a stable condition to an unstable condition. The multivibrators are arranged in pairs with each pair serving to control an output gate circuit to which the trigger signal from the trigger generator is applied. The times that the various multivibrators remain in their unstable conditions are staggered so that at selected times following each output signal from the trigger generator one of the multivibrators in one pair will have returned to its stable condition while the other will still be in its unstable condition. By using the first of each pair of the pairs of multivibrators to inhibit the passage of a signal through the associated gate circuit and the other of each pair of multivibrators to open the gate, a system is provided wherein only a selected one of the plurality of gates will be open at a given time. The first signal from the trigger generator serves to cause the sequential opening of the gates so that when a second signal from the trigger generator is applied to the gates it will pass through a single one of the gates which has a "time slot" corresponding to the occurrence of the second trigger signal.

A feedback circuit from each of the gate circuits is coupled with the trigger generator so that when a signal passes through any one of the gate circuits the trigger generator is turned off and will not provide any further trigger signals for a predetermined time interval. Thus the detection system serves to provide frequency selection making use of a very short portion of an audio tone signal. In one embodiment of the invention the trigger generator responds to the crossing of a zero reference axis by the audio tone with the arrangement being such that only two crossings of such zero reference axis by the audio tone are required for accurate frequency selection and hence for accurate receiver selection. A sequence decoding and counting matrix coupled with the outputs of the gate circuits serves to determine each unique code address and thereby permit selective activation of only one of a number of indicator or alarm circuits in the receiver coupled with the matrix.

Using a typical combination and sequence of tones wherein three separate tones are used one at a time in six different sequential time intervals it can be shown that the resulting six digit address system gives a total of 729 unique addresses. Relatively few circuit components are required and yet the filter problems associated with single side-band communications equipment are avoided.

Figures 2, 3:
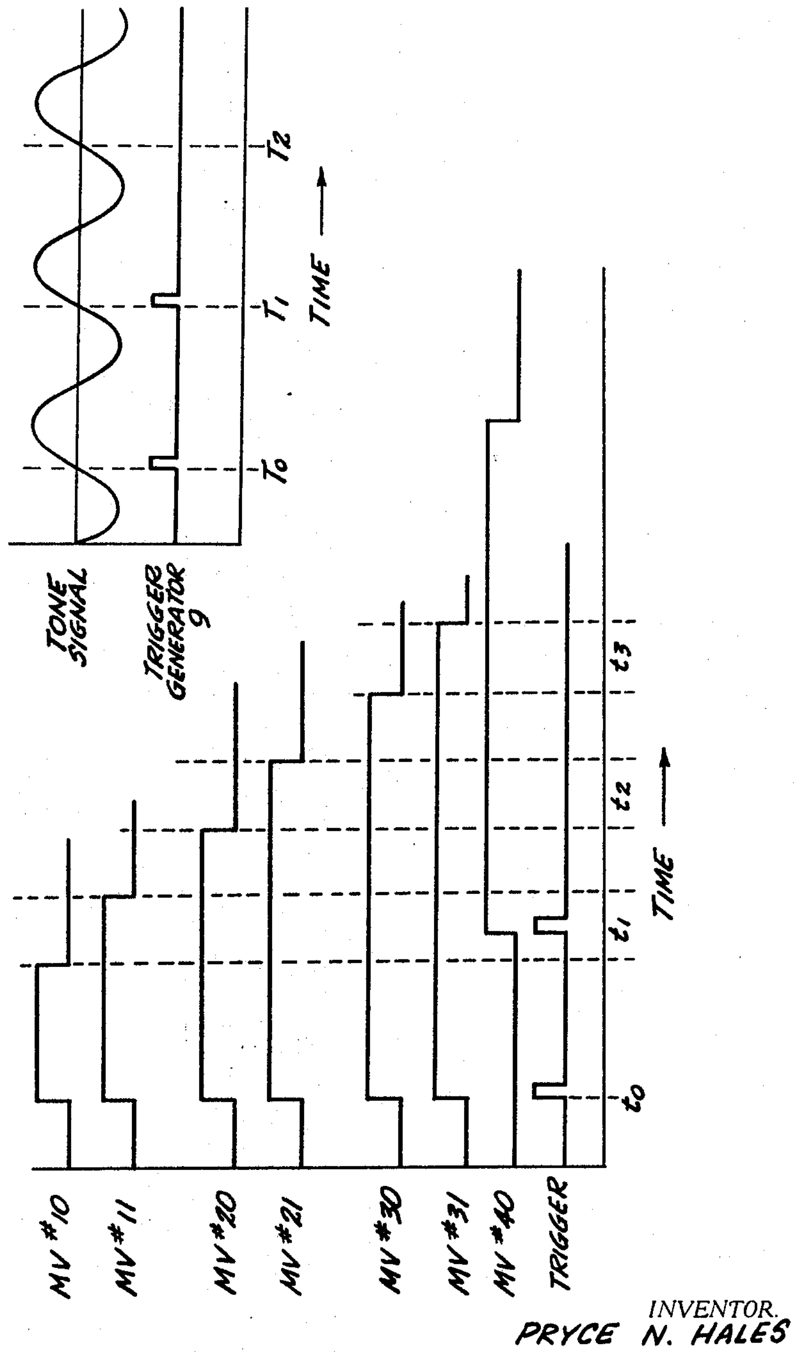
Figure 4:
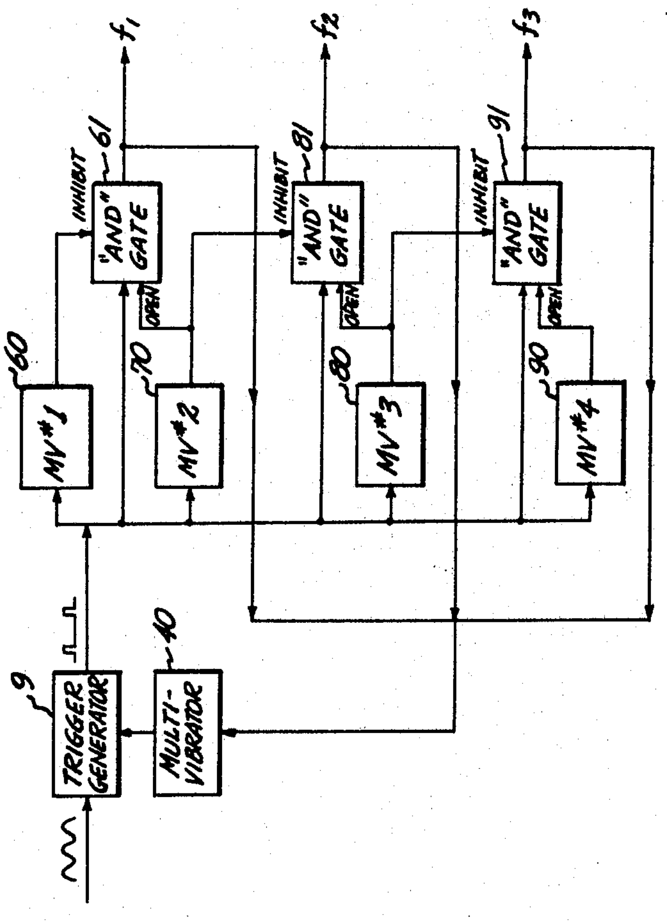

The invention will be more clearly understood from the following description when read with reference to the accompanying drawings wherein: FIGURE 1 is a block diagram of a preferred embodiment of the present invention; FIGURE 2 is a timing diagram illustrating the time of occurrence of various signals in the system of FIGURE 1; FIGURE 3 is a timing diagram showing a typical audio tone and the resulting trigger signals provided in the system of FIGURE 1; and FIGURE 4 is an alternative embodiment of the invention adapted for use in detecting the frequency of a signal when the frequency difference between adjacent frequencies in the spectrum being utilized approaches zero.

Referring now to the drawings and in particular to FIGURES 1 and 2, the preferred embodiment of the invention of FIGURE 1 will be described with reference thereto and to the timing diagrams of FIGURES 2 and 3. The invention can be used in various types of communication systems, whether radio or wire connected, and thus the system of FIGURE 1 will be seen to include a radio receiver 8 which receives and detects sequenced signals of various frequencies which are utilized at the present time in many communication systems for activating a selected receiver. The output signals from the receiver 8 are applied to the trigger generator 9 which as shown in FIGURE 3 responds to the tone signal and provides an output pulse at a selected time in each cycle of the tone signal. For purpose of illustration the waveforms shown in FIGURE 3 are for a system wherein the trigger generator responds to the tone signal crossing its zero reference axis in the positive going direction so that the separation of two adjacent signals from the trigger generator 9 corresponds to the time required for one complete cycle of the tone signal. The system requires only one complete cycle of the tone signal and the start of a second cycle in order to permit accurate determination of the frequency of the signal being received. Thus in practice only two trigger signals are provided for each tone. Thus in FIGURE 3 a trigger signal is provided at times $T_1$ and $T_2$ when the tone signal crosses the zero reference axis, but at time $T_3$ when the tone signal again crosses the zero axis the trigger generator has been disabled by a feedback arrangement in the system of FIGURE 1.

The output circuit from the trigger generator 9, which may for example be a Schmitt trigger circuit, is coupled to three pairs of multivibrators shown as the pairs 10 and 11, 20 and 21, and 30 and 31. The multivibrators are of the triggered monostable type. A first gating circuit shown as an "AND" gate 12 is coupled to the output of the multivibrators 10 and 11 and is also provided with a signal input circuit 13 which is connected with the output circuit of the trigger generator 9. In a similar manner second and third "AND" gates 22 and 32 are respectively coupled with the multivibrators 20 and 21, and 30 and 31 as well as to the output circuit of the trigger generator 9 by the leads 23 and 33, respectively. The output circuits for the multivibrators 10, 20, and 30 are indicated as being "inhibit" circuits which serve to hold the associated gates 12, 22 and 32 in a closed condition when the multivibrators 10, 20 and 30 are in their unstable conditions. The multivibrator output circuits for the multivibrators 11, 21 and 31 are indicated as being "open" circuits to signify that when these multivibrators are in their unstable conditions the signal provided to the associated gate circuit attempts to open the gate. As is well known in the art, the inhibit signals prevent the passage of a signal through the gates even though the gate is being provided with an appropriate opening signal by the multivibrators 11, 21 and 31. The gates 12, 22 and 32 can be exclusive "OR" gates in that they are adapted to provide passage of a signal from the input leads 13, 23 or 33 when there is a signal from one or the other of the associated pair of multivibrators but not when there is a signal from each of the two associated multivibrators. Such gates made from diodes, transistors, and resistors are well known and conventional in the art.

Each gate circuit has a feedback circuit 14, 24, and 34 respectively coupled to the input of a multivibrator 40 which in turn has its output circuit coupled for control of the trigger generator 9. The arrangement is such that when any one of the output gates 12, 22 or 32 has a signal from its input circuit 13, 23 or 33 pass through the gate a signal is applied to the multivibrator 40 which serves to hold the trigger generator 9 inoperative for a predetermined time interval corresponding to the unstable time of the multivibrator 40.

The system shown in FIGURE 1 is illustrated as being adapted to respond to a timed sequence of tone signals of various frequencies and thus the output circuits from the gates 12, 22 and 32 are coupled to the sequence decoding and counting matrix 41 which has a plurality of output circuits 41A, 41B, 41C, 41D and 41E respectively connected to the indicator devices 42–46. The matrix 41, as is well known in the art, responds to the signals from the gate circuits 12, 22 and 32 and selects a given one of the indicator devices in accordance with the sequence of signals received from the gates. When three different tones (i.e. frequencies) are used one at a time with six time intervals being utilized for each address to form a six digit address, the matrix 41 can control 729 separate indicators and thus will serve to select any one of 729 separate receivers. It is obvious that the number of digits in the address can be expanded to further increase the number of receivers controlled by the system. The indicator devices can be in the form of lights, buzzers, or other types of audio and/or visual indicators for a given receiver.

The operation of the system of FIGURE 1 is as follows: When a given receiver selection signal (referred to as a tone signal) is received, the trigger generator 9 will provide a first signal at time $T_0$ (FIGURE 3) as the tone signal crosses the zero reference axis. This trigger signal at $T_0$ serves to trigger each of the multivibrators 10, 11, 20, 21, 30 and 31 into their unstable conditions as shown in FIGURE 2.

As seen in FIGURE 2, the multivibrator 10 remains in its unstable condition for a first length of time while the multivibrator 11 remains in its unstable condition for a slightly longer time. Thus a first time interval $t_1$ is defined between the time of termination of the unstable condition of multivibrator 10 and termination of the unstable condition of multivibrator 11. The multivibrator 10 inhibits the gate 12 and overrides any "open" signal from the multivibrator 11. Thus it will be seen that the gate 12 is open only during the time interval $t_1$ therefore if a subsequent trigger signal is received from the generator 9 during the time interval $t_1$ the gate 12 will provide an output to the matrix 41. Such an output from gate 12 will simultaneously trigger the multivibrator 40 so that further signals from the trigger generator 9 are prevented for a predetermined time. In a similar manner the termination of the signals of the multivibrators 20 and 21 are staggered to define a second time interval $t_2$ and the multivibrators 30 and 31 to define a third time interval $t_3$. In the waveforms of FIGURE 2 it will be seen that a second trigger signal occurred during the time interval $t_1$ and hence no further trigger signals are shown since the second trigger signal would have passed through the gate 12, back to multivibrator 40, and hence trigger generator 9 would have been disabled. This is further illustrated in FIGURE 3 wherein it will be seen that at time $T_2$ when the tone signal again crosses the zero reference axis the trigger generator does not provide a further output signal.

From the above it will be seen that with the system of FIGURE 1 a little more than one complete cycle of the tone signal is all that is required for the system to accurately determine the frequency of the tone and provide a signal to the matrix 41. The unstable state of the multivibrator 40 is selected to correspond to approximately the duration of a single digit (or tone duration) in the address so that a single output signal from one of the gates 12, 22, or 32 will be provided in response to each received digit of the address.

Figure 4A:
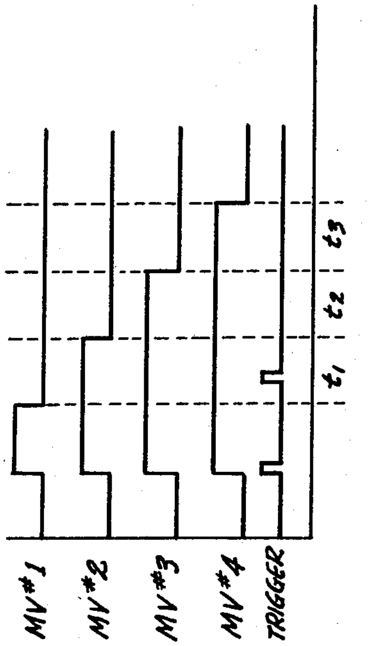

The concepts of the present invention are also applicable to a system wherein adjacent frequencies to be detected are separated by only a very small frequency difference. Thus referring to FIGURE 4 it will be seen that four multivibrators 60, 70, 80 and 90 serve to control the three gates 61, 81 and 91. In the embodiment of FIGURE 4 the multivibrator 60 provides an inhibit signal for the gate 61 while the multivibrator 70 serves to open gate 61 and simultaneously inhibit gate 81. In a similar way multivibrator 80 serves to open gate 81 and inhibit gate 91 while multivibrator 90 serves to open gate 91. The relative timing of the output signals from the multivibrators 60, 70, 80 and 90 is illustrated in FIGURE 4A wherein it will be seen that three immediately adjacent successive time intervals $t_1$, $t_2$, and $t_3$ are defined by the output signals from the multivibrators 60, 70, 80 and 90 and the gates 61, 81 and 91. The signals from the gates in FIGURE 4 are applied to a counting circuit that must receive the correct number of pulses from the correct gates and in the proper order before an indication for a given address is presented. If an improper address for a given receiver is received, then no indication is presented and the counting circuit for that receiver resets itself. It should be noted that the output signals from the gate circuits can be connected to the receivers through appropriate gating matrices so that more than one code will activate a receiver. This is readily accomplished by setting each matrix for a number of codes in a plural receiver communication system. Thus in a communication system such as that used by a police force each squad car, motorcycle, and precinct would have an individual address as well as an address which would be common to all of the receivers. Each precinct could send and receive calls on a selective basis to the units under its command, as well as on a collective call that alerts all squad cars and motorcycle units. Numerous combinations could be used, such as a collective call for simultaneously alerting all units in all precincts.

There has thus been disclosed an improved signal detection system which serves to identify various frequencies in a communication signaling network. The system does not require filter networks but works on digital techniques and hence avoids the problems inherent in the frequency shift associated with single side-band communications equipment. Frequency lock-on or identification is achieved when the same point on two successive cycles has been received. Thus less than two complete cycles of the received signal is required and accordingly the problems usually precipitated by frequency shift are eliminated. In the embodiments shown the length of audio tone and separation between bursts can be on a one-to-one ratio and thus rapid station selection can be achieved.

What is claimed is:

1. A frequency determining system comprising in combination: a trigger signal circuit responsive to received signals for providing successive output trigger signals spaced in time proportional to a cycle of the received signal; a plurality of gate circuits each coupled with said trigger circuit; gate circuit control means coupled with said trigger circuit and with said gate circuits and responsive to a first trigger signal to cause sequential opening of said gate circuits for mutually exclusive time intervals; and trigger circuit control means coupled with the output of each gate circuit and with said trigger circuit and inhibiting output trigger signals from said trigger circuit for a predetermined time in response to an output signal from a gate circuit.

2. A system as defined in claim 1 wherein said gate circuit control means includes a plurality of timing circuits each in a first condition prior to receipt of a first trigger signal and simultaneously responsive to said first trigger signal to change to a second condition for different time intervals and then revert to their said first conditions.

3. A system as defined in claim 2 wherein said timing circuits are monostable multrivibrators each having a different unstable time duration.

4. A system as defined in claim 3 wherein each of said gate circuits is coupled with two of said multivibrators and is conditioned for providing an output signal in response to receipt of a trigger signal only when one of said two multivibrators is in its stable condition and the other is in its unstable condition.

5. A system as defined in claim 4 wherein one of said multivibrators is coupled with two of said gate circuits and provides a gate opening signal to one of said gate circuits and a gate inhibiting signal to the other said gate circuit.

6. A system as defined in claim 3 wherein said trigger circuit control means includes a monostable multivibrator coupled with each of said gate circuits for being triggered to its unstable condition in response to an output signal from a gate circuit.

7. A system as defined in claim 6 wherein the unstable period of said multivibrator in said trigger circuit control means is longer than the unstable period of any multivibrator in said gate circuit control means.

8. A signaling system comprising in combination: a trigger generator responsive to applied alternating signals to provide output trigger signals separated in time in proportion to the frequency of the applied signal; circuit means including a plurality of gate circuits each having an input circuit coupled with said trigger generator and further including timing means responsive to a first trigger signal to render said gate circuits sequentially open for mutually exclusive time intervals; trigger generator control means coupled iwth each of said gate circuits and with said trigger generator and responsive to an output signal from any gate circuit to render said trigger generator inoperative until the termination of the last of said time intervals; sequence decoding means coupled with said gate circuits; and indicator means coupled with said decoding means.

References Cited

UNITED STATES PATENTS 3,319,225 5/1967 Anderson.

JOHN W. CALDWELL, Primary Examiner

H. I. PITTS, Assistant Examiner

U.S. Cl. X.R.

340—164, 167, 170, 171